US006393376B1

(12) United States Patent
Andreas

(10) Patent No.: US 6,393,376 B1
(45) Date of Patent: May 21, 2002

(54) METHOD OF DETERMINING A ROADWAY CURVE RADIUS

(75) Inventor: Peter Andreas, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/366,833

(22) Filed: Aug. 4, 1999

(30) Foreign Application Priority Data

Aug. 8, 1998 (DE) .......................................... 198 35 999
Oct. 8, 1998 (DE) .......................................... 198 46 425

(51) Int. Cl.[7] .............................................. G01B 11/08
(52) U.S. Cl. ...................... 702/157; 702/140; 702/150; 702/158; 71/1; 71/72; 71/201; 71/206; 71/207; 71/208; 71/209; 71/210; 342/70; 342/160; 342/161
(58) Field of Search ................................ 702/140, 150, 702/157, 158; 342/70, 160, 161; 701/1, 72, 201, 206, 207, 208, 209, 210

(56) References Cited

U.S. PATENT DOCUMENTS

| 4,925,253 A | * | 5/1990 | Swiden ........................ 303/110 |
| 4,926,955 A | * | 5/1990 | Ohmura et al. .............. 180/140 |
| 4,969,694 A | * | 11/1990 | Caron ............................ 303/1 |
| 5,102,202 A | | 4/1992 | Breen |
| 5,244,259 A | * | 9/1993 | Pickenhaln et al. ......... 303/111 |
| 5,315,295 A | | 5/1994 | Fujii |
| 5,473,544 A | | 12/1995 | Yamashita .............. 364/426.03 |
| 5,479,811 A | | 1/1996 | Baumann et al. |
| 5,764,137 A | * | 6/1998 | Zarkhin ....................... 340/444 |
| 5,828,975 A | | 10/1998 | Isshiki et al. |
| 5,959,569 A | * | 9/1999 | Khodahai ..................... 342/70 |
| 6,138,084 A | * | 10/2000 | Mine ........................... 702/157 |
| 6,178,370 B1 | * | 1/2001 | Zierolf ......................... 701/71 |
| 6,182,518 B1 | * | 2/2001 | Baur .......................... 73/865.9 |
| 6,202,027 B1 | * | 3/2001 | Alland et al. ................ 701/301 |

FOREIGN PATENT DOCUMENTS

| DE | 4008167 | 9/1991 |
| DE | 4111614 | 10/1992 |
| DE | 0529280 | 3/1993 |
| DE | 4229967 | 3/1994 |
| DE | 4314827 | 11/1994 |
| DE | 19749916 | 5/1998 |
| EP | 849109 | 6/1998 |

* cited by examiner

*Primary Examiner*—Arthur T. Grimley
*Assistant Examiner*—John Le
(74) *Attorney, Agent, or Firm*—Baker Botts, LLP

(57) ABSTRACT

A curve radius of a roadway is determined by measuring the difference in wheel speed of at least two vehicle wheels and the rate of yaw of the vehicle, and hence the curve radius, is determined therefrom. The wheel speeds are determined by measuring the time required for the wheel to rotate by a fixed rotational angle, based on a fixed number of pulses produced by a pulse transmitter which is part of an ABS or ASR system for the vehicle. The method provides considerably improved accuracy using simple, vehicle-contained components and various parameters can be taken into account simultaneously.

5 Claims, 2 Drawing Sheets

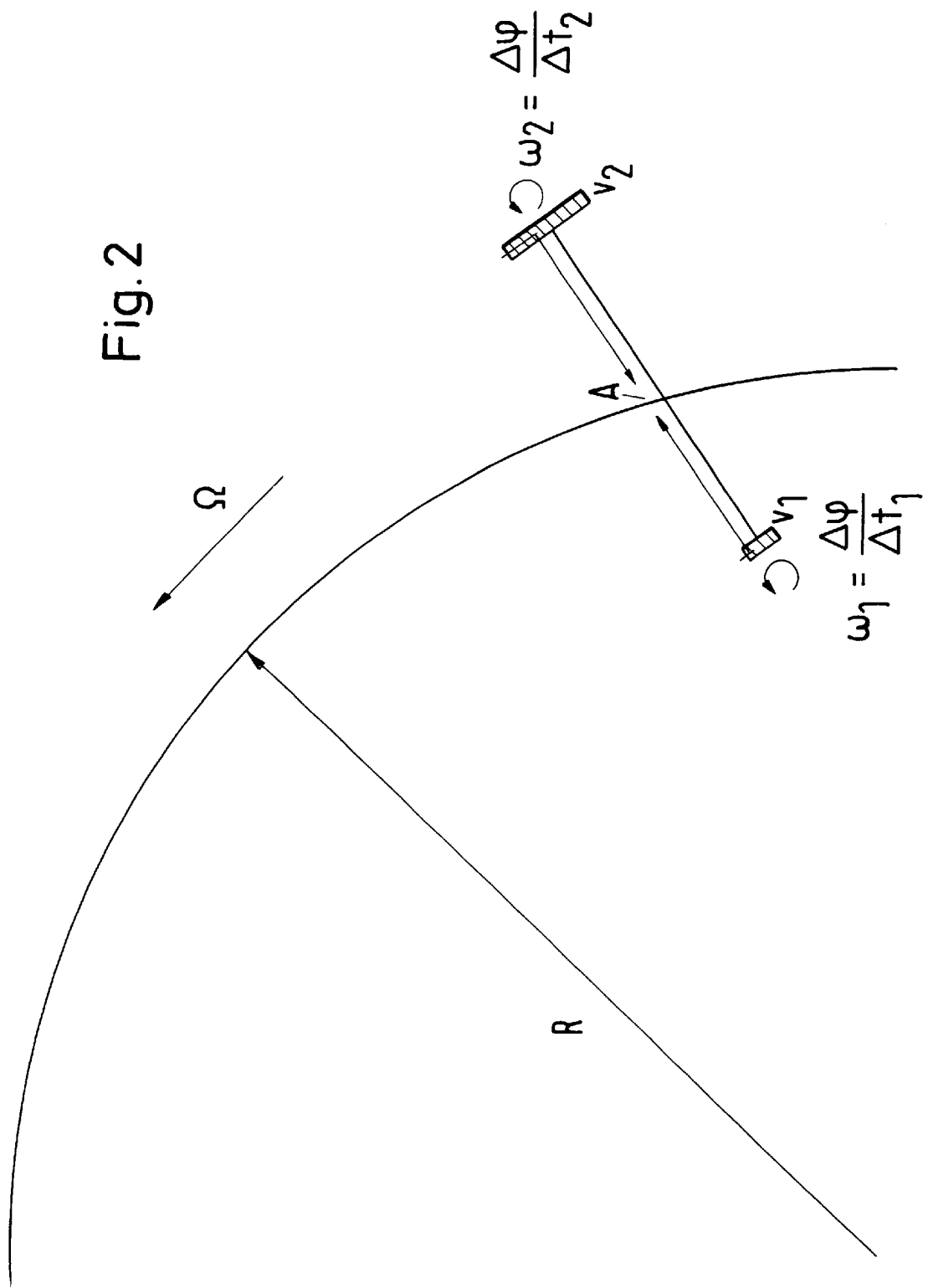

METHOD OF DETERMINING A ROADWAY CURVE RADIUS

BACKGROUND OF THE INVENTION

This invention relates to methods for determining the curve radius of a roadway wherein the difference in wheel speeds of at least two unpowered wheels of a vehicle is measured and the rate of yaw of the vehicle, and hence the radius of the curve, is determined therefrom.

When negotiating curves in a roadway, the driver of a motor vehicle regulates the vehicle speed according to the roadway curve radius, the roadway conditions and the weather conditions. Increasingly, however, modem motor vehicles are equipped with vehicle speed control systems as well as navigation systems so that it is desirable to obtain accurate information concerning the course and condition of the roadway. This information may then be made available to the speed control system and/or the navigation system in the form of relevant parameters. In this way, for example, the course of the roadway may be compared with roadway information in a stored map, thus substantially improving the accuracy of the navigation system.

Such systems assist the driver operating the motor vehicle, insofar as possible, thereby also enhancing traffic safety.

In this connection, European Published Application No. 84 91 09 discloses a method for prospective determination of the route course ahead of a motor vehicle for an automatic distance warning system. In this method a curve radius is measured from the difference between the wheel speeds of at least two driving wheels. Since the wheel speeds of the driving wheels depends not only on the vehicle speed but also on other factors such as wheel slip and roadway condition, the curve radius determined by this method results in an approximate value only.

SUMMARY OF THE INVENTION

Accordingly, it is an object of the present invention to provide a method for determining a roadway curve radius which overcomes disadvantages of the prior art.

Another object of the invention is to provide a method of determining a roadway curve radius that uses conventional vehicle components in a simple way to measure a roadway curve radius with considerably greater accuracy and is capable of taking other influences into account at the same time.

These and other objects of the invention attained by assigning a fixed rotational angle corresponding to a fixed number of pulse generator pulses for each wheel, measuring the aggregate of a series of wheel pulses over the assigned wheel angle determining a ratio of the aggregate pulses from the wheels of a pair on one axle, and determining the aggregate wheel slip and hence the curve radius of turning from the ratio.

By this method, which is easily realized, the curve radius or the roadway curvature can be determined with very high precision without requiring any additional external equipment.

The simplest way to select the constant rotational wheel angle is to select a constant number of rotational pulses since vehicles having ABS or ASR have rotational pulse transmitters on all wheels.

To enhance the precision of measurement, it is advantageous if, for example, an "offset" equation of the times to generate the constant number of pulses are determined for all wheels before each measurement or at preassigned time intervals by forming a mean of the ratios of the measured times. Such an offset equation is helpful in compensating for variations due to roadway differences, different road conditions, or differences in tires. The mean is a measure of the error between the two wheels when traveling in a straight line and may be taken into account in calculating the curve radius.

To eliminate the influence of vehicle acceleration processes as a source of possible error, it is further advantageous if the starting times of the time measurement for each pair of wheels are synchronized.

BRIEF DESCRIPTION OF THE DRAWINGS

Further objects and advantages of the invention will be apparent from a reading of the following description in conjunction with the accompanying drawings, in which:

FIG. 2 is a schematic illustration similar to FIG. 1 showing the determination of a time ratio for the pair of wheels.

DESCRIPTION OF PREFERRED EMBODIMENTS

Figure 1:
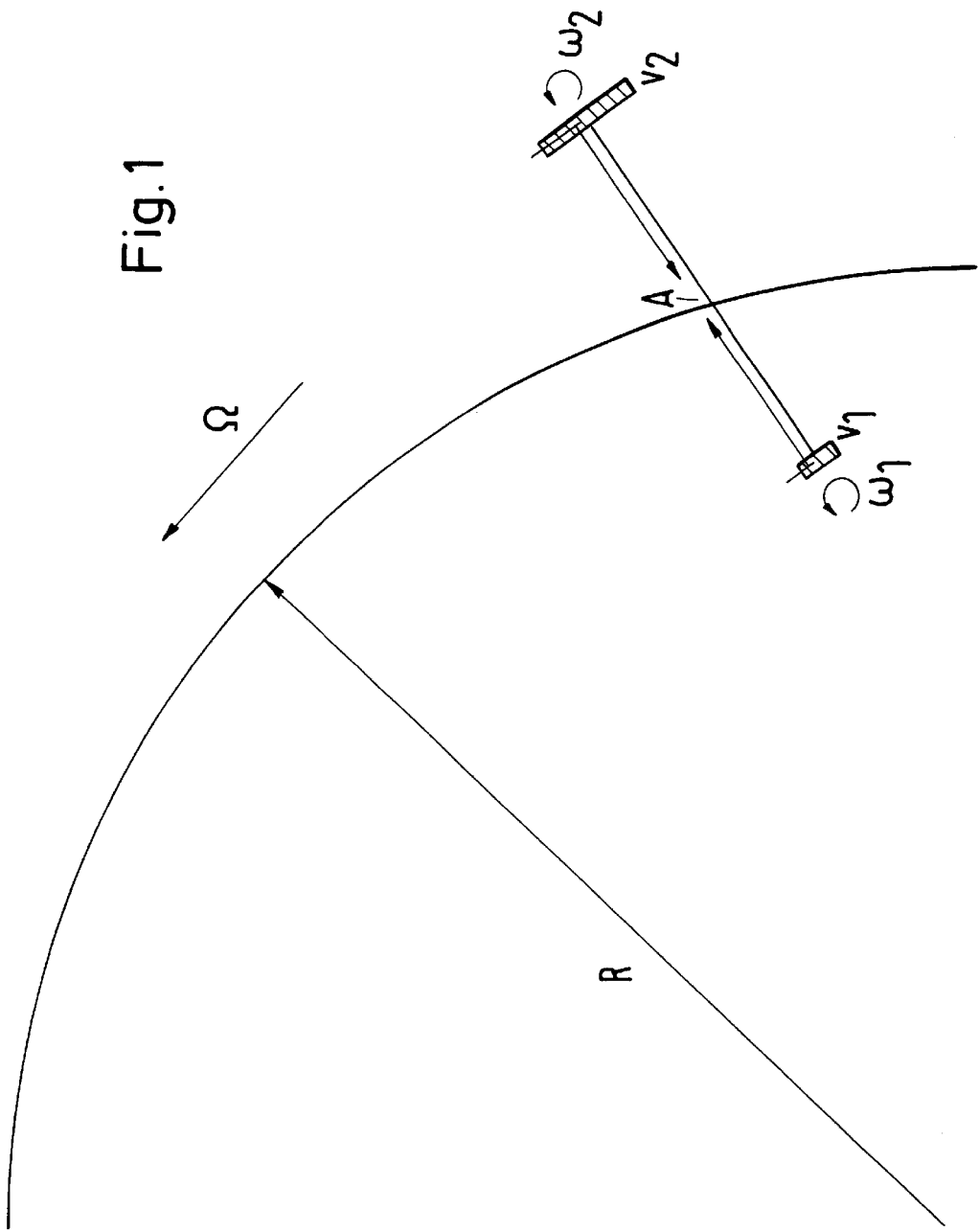
FIG. 1 is a schematic illustration showing a pair of wheels of a motor vehicle following a curve of radius R along a path length $\Omega$ in which the pair of wheels are spaced at a constant distance A from each other.

To determine the curve radius R, each wheel has a pulse transmitter, not shown, and a constant rotational wheel angle $\phi$ having the same value for each wheel is preassigned. This can be done by simply preassigning a constant number of rotational pulses from the pulse transmitter corresponding to a wheel angle $\phi$.

For freely rotating, unpowered wheels the translatory speeds $v_1$ and $v_2$ of the two wheels satisfy the following relationships:

$$v_1 = \left(R - \frac{A}{2}\right) * \Omega = r_1 * \omega_1 \tag{1}$$

$$v_2 = \left(R + \frac{A}{2}\right) * \Omega = r_2 * \omega_2 \tag{2}$$

where $r_1$ and $r_2$ are the radii of curvature of the paths of the two wheels, respectively, and $\omega_1$ and $\omega_2$ are the angular velocities of the wheels. The curve radius R may then be calculated using the following formula:

$$R = \frac{A}{2} * \frac{1 + \frac{r_1 * \omega_1}{r_2 * \omega_2}}{1 - \frac{r_1 * \omega_1}{r_2 * \omega_2}} = \frac{A}{1 - \frac{r_1 * \omega_1}{r_2 * \omega_2}} \tag{3}$$

This simplification for the curve radius R holds because of the following relationship:

$$\frac{r_1 * \omega_1}{r_2 * \omega_2} = \frac{R - \frac{A}{2}}{R + \frac{A}{2}} \approx 1 \tag{4}$$

It assumed in this simplification that R>250 m and A<2 m.

For the angular velocity ω of each wheel, we have:

$$\omega = \frac{\Delta \phi_0}{\Delta t} \quad (5)$$

where $\Delta\phi_0$ is a fixed angle and $\Delta t$ is the time for wheel rotation through the angle $\Delta\phi_0$.

Substitution in equation (4) gives:

$$\frac{1}{R} = \frac{1}{A}\left(1 - \frac{r_1}{r_2} * \frac{\Delta t_2}{\Delta t_1}\right) \quad (6)$$

For the ratio of the actual radii, if we put $r_1/r_2=\xi$, and $\Delta t_2/\Delta t_1=\tau$ for the actual time measurement, then we have for the reciprocal of the curve radius:

$$\frac{1}{R} = (1 - \xi * \tau) \quad (7)$$

On a straightway, $1/R \to 0$ and $\xi*t_0 \to 1$; $\tau_0=1/\xi$. Then:

$$\frac{1}{R} = \frac{1}{A}\left(1 - \frac{\tau}{\tau_0}\right) \quad (8)$$

Now $\tau_0$ is determined simply by averaging:

$$\tau_0 = mw10'(\tau)$$

With this method, a synchronized measurement of the times $\Delta t_1$ and $\Delta t_2$ is performed for a preassigned rotational wheel angle, or a preassigned number of rotational speed pulses for both wheels on one axle, so that the time ratio $\tau=\Delta t_2/\Delta t_1$ can be determined as indicated in FIG. 2.

Then according to equation (8), the actual curve radius is:

$$R = \frac{A}{1 - \frac{t}{\tau_0}} \quad (9)$$

In this case, $\tau_0 - \tau(R \to \infty) \approx mw(\tau)$

The curve radius A determined in this manner can now be supplied to an onboard computer in the vehicle for use in a speed control or navigation system or the like.

Although the invention has been described herein with reference to specific embodiments, many modifications and variations therein will readily occur to those skilled in the art. Accordingly, all such variations and modifications are included within the intended scope of the invention.

I claim:

1. A method of determining a roadway curve radius from the difference between wheel speeds of at least two unpowered wheels comprising assigning a constant rotational wheel angle to each wheel, measuring an aggregate time period for the wheel to rotate the assigned rotational wheel angle for each wheel, determining a ratio of the aggregate time periods for the wheels of a pair of wheels on one axle to rotate the assigned rotational wheel angle, and determining a transverse slip and hence the roadway curve radius from the ratio of the aggregate time periods.

2. A method according to claim 1 wherein the constant rotational wheel angle is determined by preassigning a constant number of rotational pulses from a rotational pulse transmitter for each wheel.

3. A method according to claim 1 including determining an "offset" equation of the time permits measured on all wheels by forming a mean of the ratios of the measured time periods.

4. A method according to claim 3 wherein the offset equation is determined at preassigned time intervals.

5. A method according to claim 1 wherein the beginning of time measurements on the wheels of a pair of wheels is synchronized.

* * * * *